US012455531B2

(12) United States Patent
Meguro et al.

(10) Patent No.: US 12,455,531 B2
(45) Date of Patent: Oct. 28, 2025

(54) IMAGE FORMING APPARATUS INCLUDING A TRANSFERER THAT REDUCES VARIATIONS IN TRANSFER PRESSURE BETWEEN A TRANSFER ROLLER AND IMAGE BEARER DURING OPENING AND CLOSING OF A COVER OF THE IMAGE FORMING APPARATUS

(71) Applicants: Yuuji Meguro, Kanagawa (JP); Masaharu Furuya, Kanagawa (JP); Shogo Kezuka, Kanagawa (JP)

(72) Inventors: Yuuji Meguro, Kanagawa (JP); Masaharu Furuya, Kanagawa (JP); Shogo Kezuka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/737,346

(22) Filed: Jun. 7, 2024

(65) Prior Publication Data

US 2024/0411264 A1 Dec. 12, 2024

(30) Foreign Application Priority Data

Jun. 12, 2023 (JP) ................................. 2023-096303

(51) Int. Cl.
*G03G 21/16* (2006.01)
*G03G 15/00* (2006.01)

(52) U.S. Cl.
CPC ....... *G03G 21/168* (2013.01); *G03G 15/6558* (2013.01); *G03G 21/1633* (2013.01); *G03G 21/1638* (2013.01); *G03G 21/1647* (2013.01); *G03G 2215/00409* (2013.01); *G03G 2215/1614* (2013.01); *G03G 2221/1642* (2013.01)

(58) Field of Classification Search
CPC ............. G03G 15/167; G03G 15/6558; G03G 21/1633; G03G 21/1638; G03G 21/1647; G03G 21/168; G03G 2215/00409; G03G 2215/1614; G03G 2215/1642
See application file for complete search history.

(56) References Cited

U.S. PATENT DOCUMENTS

| | | | | |
|---|---|---|---|---|
| 8,396,394 | B2 * | 3/2013 | Lee ...................... | G03G 21/168 399/315 |
| 2005/0244189 | A1 | 11/2005 | Kimura et al. | |
| 2007/0183816 | A1 | 8/2007 | Hatayama et al. | |
| 2007/0269233 | A1 | 11/2007 | Sakashita et al. | |

(Continued)

FOREIGN PATENT DOCUMENTS

| | | |
|---|---|---|
| JP | 2010-015059 A | 1/2010 |
| JP | 2020-052109 A | 4/2020 |

*Primary Examiner* — Sophia S Chen
(74) *Attorney, Agent, or Firm* — Harness, Dickey & Pierce, P.L.C.

(57) ABSTRACT

An image forming apparatus includes: a body; a cover openably attached to the body; an image bearer; a transferer attachable to the cover, the transferer including: a transfer roller facing the image bearer and displaceable between: a contact position at which the transfer roller comes into contact with the image bearer; or a separated position at which the transfer roller is separated from the image bearer; and a holder rotatably holding the transfer roller; and a biasing member to bias the transfer roller toward the image bearer to the contact position, a support shaft swingably supporting the holder; and a pressure receiver to receive the holder.

6 Claims, 5 Drawing Sheets

(56) References Cited

U.S. PATENT DOCUMENTS

| | | | |
|---|---|---|---|
| 2008/0028967 | A1 | 2/2008 | Sakashita et al. |
| 2010/0003051 | A1 | 1/2010 | Sekina et al. |
| 2013/0051854 | A1 | 2/2013 | Sakuma et al. |
| 2014/0147165 | A1 | 5/2014 | Sakuma et al. |
| 2015/0090564 | A1 | 4/2015 | Iwaya et al. |
| 2015/0117914 | A1 | 4/2015 | Hozumi et al. |
| 2015/0125189 | A1 | 5/2015 | Hozumi et al. |
| 2015/0227089 | A1 | 8/2015 | Hozumi et al. |
| 2015/0234316 | A1 | 8/2015 | Kanaya et al. |
| 2015/0301484 | A1 | 10/2015 | Hozumi et al. |
| 2015/0314976 | A1 | 11/2015 | Hozumi et al. |
| 2016/0062279 | A1 | 3/2016 | Hozumi et al. |
| 2019/0235418 | A1* | 8/2019 | Nakamura ........... G03G 15/167 |

* cited by examiner

IMAGE FORMING APPARATUS INCLUDING A TRANSFERER THAT REDUCES VARIATIONS IN TRANSFER PRESSURE BETWEEN A TRANSFER ROLLER AND IMAGE BEARER DURING OPENING AND CLOSING OF A COVER OF THE IMAGE FORMING APPARATUS

CROSS-REFERENCE TO RELATED APPLICATIONS

This patent application is based on and claims priority pursuant to 35 U.S.C. § 119 (a) to Japanese Patent Application No. 2023-096303, filed on Jun. 12, 2023, in the Japan Patent Office, the entire disclosure of which is hereby incorporated by reference herein.

BACKGROUND

Technical Field

The present embodiment relates to an image forming apparatus.

Related Art

In an electrophotographic image forming apparatus, an image bearer and a transfer member such as a transfer roller have a transfer nip therebetween. The transfer nip is provided in the vertical direction of the image forming apparatus. A transfer sheet as a recording medium is conveyed in the longitudinal direction of the image forming apparatus. With this arrangement, in a transferer, the position of the transfer nip is shifted to the upstream side in the sheet conveyance direction with respect to the normal position where the respective center lines of the image bearer and the transfer member are orthogonal to the sheet conveyance path, whereby the separability between the transfer sheet and the image bearer is improved. In such a transferer, the transfer member is disposed to be inclined downward in the vertical direction at a predetermined angle (about 10 to 30 degrees) with respect to the normal position where the center line of the transfer member and the center line of the image bearer are orthogonal to the sheet conveyance path.

The image forming apparatus including the transferer described above needs to open and close the sheet conveyance path in a case where, for example, the conveyance jam of a transfer sheet occurs. Thus, the image forming apparatus includes a cover having a swinging pivot at a lower portion of the image forming apparatus body such that the sheet conveyance path is openable or closeable. The transferer has a configuration such that the transfer member is separated from the image bearer in response to the opening of the sheet conveyance path. In such a transferer including the transfer member contactable to or separable from the image bearer, the transfer member is provided displaceably with respect to the image bearer such that the transfer member comes into contact with the image bearer at an appropriate position and pressure.

However, in the case of such an image forming apparatus with the cover provided openably with respect to the image forming apparatus body and with the transfer member provided displaceably with respect to the image bearer, after the cover is opened from the image forming apparatus body for opening of the sheet conveyance path, in closing of the cover, the displaceable transfer member may interfere with a member provided to the transferer body. Due to occurrence of such interference, a disadvantage may arise in that the components of the apparatus come into contact with each other, which leads to, for example, failure or positional displacement.

SUMMARY

In an aspect of the present disclosure, an image forming apparatus includes: a body; a cover openably attached to the body; an image bearer; a transferer attachable to the cover, the transferer including: a transfer roller facing the image bearer and displaceable between: a contact position at which the transfer roller comes into contact with the image bearer; or a separated position at which the transfer roller is separated from the image bearer; and a holder rotatably holding the transfer roller; and a biasing member to bias the transfer roller toward the image bearer to the contact position, a support shaft swingably supporting the holder; and a pressure receiver to receive the holder.

BRIEF DESCRIPTIONS OF THE DRAWINGS

A more complete appreciation of embodiments of the present disclosure and many of the attendant advantages and features thereof can be readily obtained and understood from the following detailed description with reference to the accompanying drawings, wherein.

Figure 1:
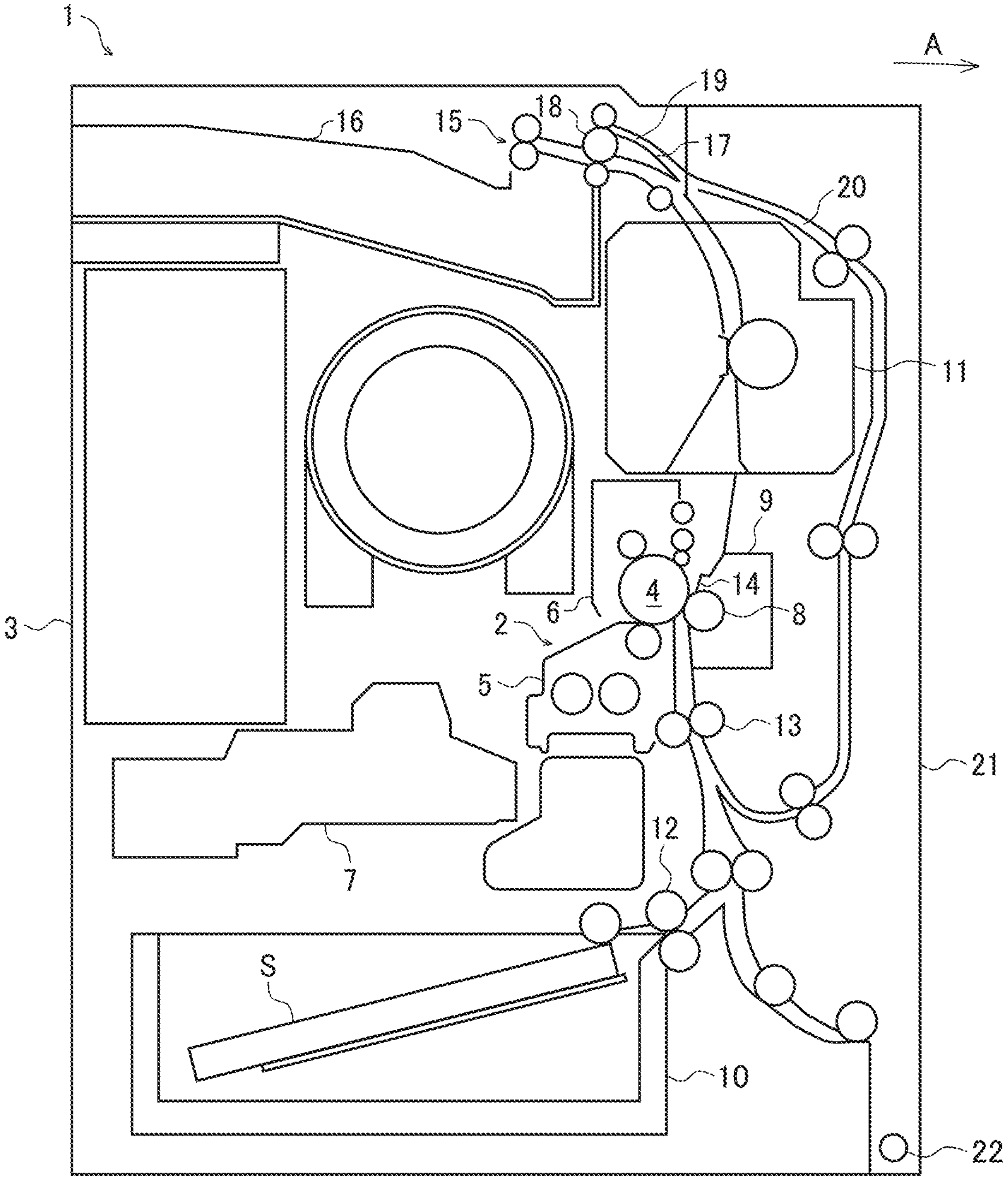
FIG. 1 is a schematic front view of an image forming apparatus according to an embodiment of the present embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

FIG. 1 illustrates an image forming apparatus according to an embodiment of the present embodiment. In the figure, a printer 1 as a monochrome image forming apparatus includes a detachable process cartridge 2 incorporating a black toner at substantially the center of a housing 3 as an image forming apparatus body. In the process cartridge 2, a photoconductor drum 4 as an image bearer, a developing device 5, a cleaner 6, a charger, and a neutralizer are provided in a replaceable manner, for example.

In the housing 3, an exposure device 7, a transferer 9 having a transfer roller 8 as a transfer member, a sheet feeding tray 10 accommodating transfer sheets S as recording media, a fixing device 11 are disposed, for example.

In normal image formation in which an image is formed on one face of such a transfer sheet S as described above, an electrostatic latent image is formed on the photoconductor drum 4 due to the operation of the exposure device 7, and the electrostatic latent image formed with the toner supplied from the developing device 5 is visualized to be a toner image. Thereafter, a single transfer sheet S stored in the sheet feeding tray 10 is fed due to the operation of a sheet feeding roller 12, and the fed transfer sheet S is temporarily stopped at a pair of registration rollers 13. Then, the pair of registration rollers 13 operates such that the image forming region of the transfer sheet S agrees with the toner image at the nip position between the photoconductor drum 4 and the transfer roller 8. The photoconductor drum 4 and the transfer roller 8 come into contact with each other with the transfer sheet S interposed therebetween and a transfer bias is applied, whereby the toner image is transferred onto the transfer sheet S.

The transfer sheet S having passed the transfer nip is charged by the application of the transfer bias. Thus, the transfer sheet S is separated from the photoconductor drum 4 or the transfer roller 8 resulting from neutralization by a neutralizing needle 14, and is sent to the fixing device 11. The transferred toner image is fused, by heat and pressure, onto the transfer sheet S sent to the fixing device 11. After the image is fixed on the transfer sheet S, the transfer sheet S is sent to a pair of sheet ejection rollers 15 to be ejected onto a sheet ejection tray 16.

In double-sided image formation in which each image is formed on a first face and a second face of a transfer sheet S, a bifurcating claw 17 is switched, and then a reverse roller 18 is rotated in a counter manner to send the transfer sheet S with the image completely fixed on the first face thereof into a reverse path 19. After the bifurcating claw 17 is returned, the reverse roller 18 is rotated forward to send the transfer sheet S into a double-sided path 20. The transfer sheet S sent into the double-sided path 20 is conveyed again by a pair of rollers to the pair of registration rollers 13 with the front and back of the transfer sheet S reversed. Thereafter, an image forming operation for the second face is performed by a process similar to the process in the normal image formation.

The printer 1 includes a double-sided cover 21 as a cover to open a conveyance path for the transfer sheet S in a case where a sheet conveyance jam occurs. The double-sided cover 21 is supported swingably at a pivot 22 with respect to the housing 3. The double-sided cover 21 is openable with its upper end facing in the direction of an arrow A in FIG. 1. In response to opening of the double-sided cover 21, the sheet conveyance path located downstream of the sheet feeding roller 12 in the sheet conveyance direction is opened.

In the present embodiment, the transferer 9 is secured to the double-sided cover 21.

Figure 2:
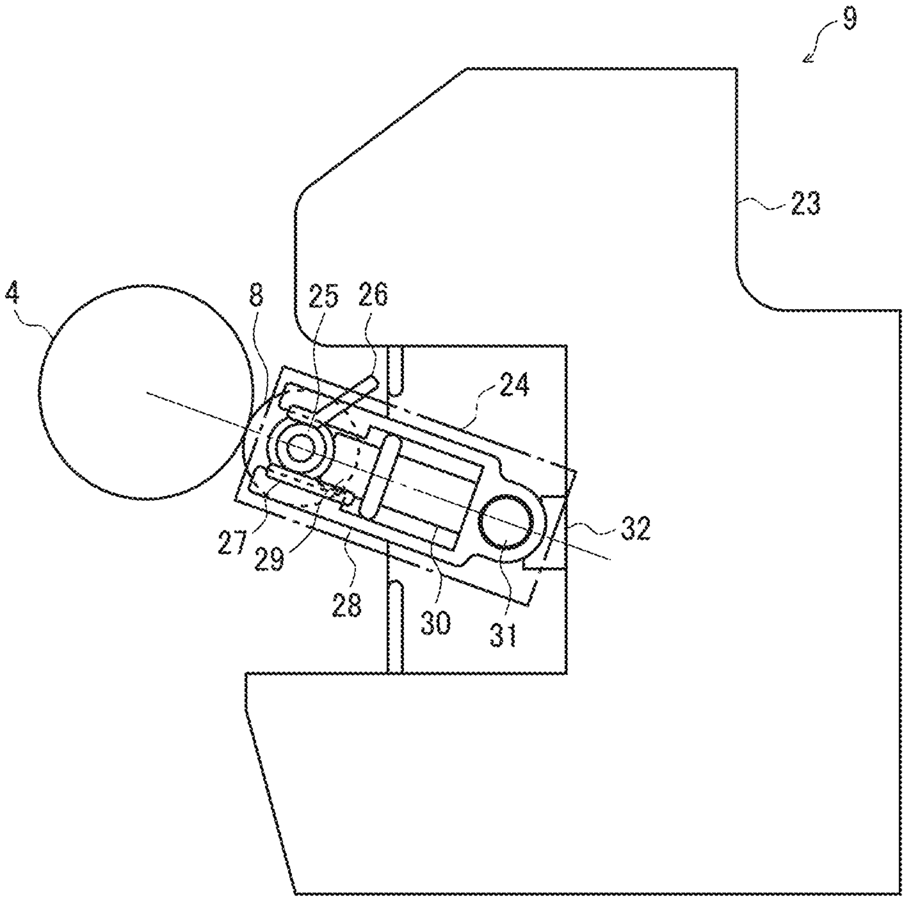
FIG. 2 is a schematic view of a transferer in image formation according to an embodiment of the present embodiment.

FIG. 2 is a schematic view of the transferer 9 as a characteristic part of the present embodiment. In the figure, the transferer 9 includes a transfer frame 23 as a transferer body, the transfer roller 8, and a pressurizer 24.

The transfer frame 23 is secured to the double-sided cover 21 by screwing, for example. The transfer roller 8 is disposed opposite the photoconductor drum 4. The transfer roller 8 is held, by the pressurizer 24, rotatably and displaceably in a direction in which the transfer roller 8 comes into contact with or separates from the photoconductor drum 4. The pressurizer 24 that pressurizes the transfer roller 8 against the photoconductor drum 4 holds the transfer roller 8 with the transfer roller 8 offset on the upstream side in the sheet conveyance direction of the photoconductor drum 4.

Figure 3:
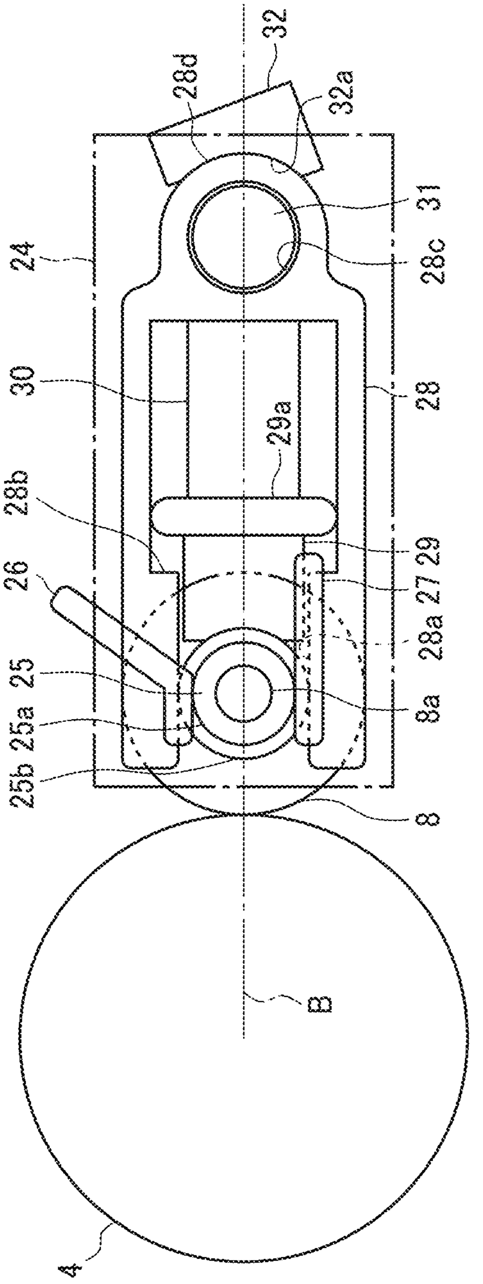
FIG. 3 is an explanatory schematic view of a transfer member and a pressurizer according to an embodiment of the present embodiment.

FIG. 3 is an explanatory schematic view of the transfer roller 8 and the pressurizer 24. In the figure, a stepped bearing 25 is fitted to a shaft 8*a* of the transfer roller 8. A small-diameter portion 25*a* of the bearing 25 is fittable to positioning members 26 and 27 as immovable members secured to the housing 3. The positioning members 26 and 27 restrict the transfer roller 8 from moving in a direction orthogonal to a line segment B connecting the center of the photoconductor drum 4 and the center of the transfer roller 8, and position the photoconductor drum 4 and the transfer roller 8 in image forming operation. The positioning member 26 has an end opposite the photoconductor drum 4, and the end is opened outward. Thus, the small-diameter portion 25*a* is guided easily.

The bearing 25 is disposed inside a spring case 28 as a holder. Further, a slider 29 and a pressurizing spring 30 as a biasing member are provided inside the spring case 28. The spring case 28 has one end closer to the photoconductor drum 4. The one end has a receiving portion 28*a* having a U shape. A large-diameter portion 25*b* of the bearing 25 is fitted to the receiving portion 28*a*.

The slider 29 supported slidably by the spring case 28 has one end and the other end. The slider 29 is in contact with the large-diameter portion 25*b* on the one end side of the slider 29 and a stopper 29*a* is provided on the other end side of the slider 29. The stopper 29*a* comes into contact with a step 28*b* provided to the spring case 28, whereby the amount of movement of the slider 29 in the spring case 28 is restricted.

The pressurizing spring 30 has one end in contact with the other end on the stopper 29*a* side of the slider 29. The pressurizing spring 30 has the other end in contact with the inside of the spring case 28. The pressurizing spring 30 pressurizes the transfer roller 8 against the photoconductor drum 4 through the slider 29 and the bearing 25.

The other end of the spring case 28 is provided with a hole 28*c* serving as a swinging pivot of the spring case 28. A support shaft 31 provided to the transfer frame 23 is fitted to the hole 28*c* through a certain gap. The outer peripheral face on the other end side of the spring case 28 has an arc shape coaxial with the hole 28*c*, and constitutes a curved face 28*d*. On the transfer frame 23 side corresponding to the curved face 28*d*, a receiving member 32 is provided with a pressure receiver 32*a* having a recessed face identical in curvature to the curved face 28*d* such that the curved face 28*d* properly comes into contact with the pressure receiver 32*a*.

Figure 4:
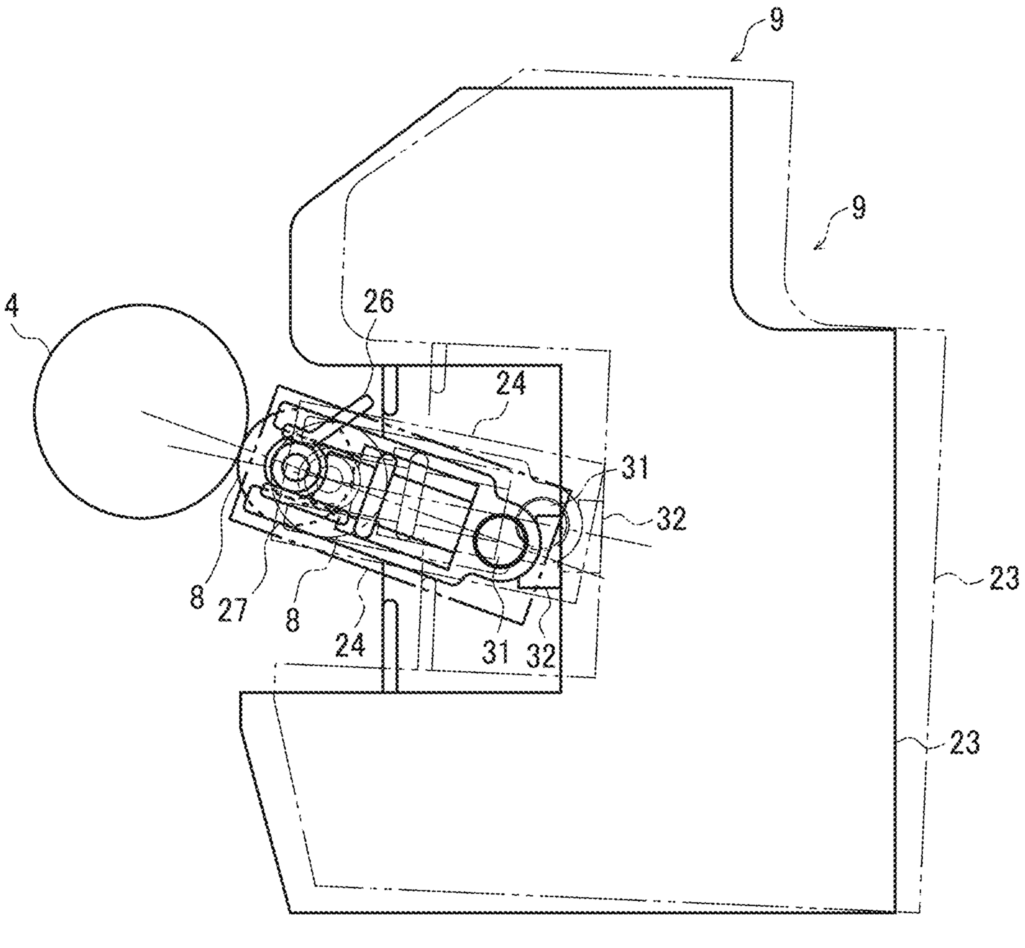
FIG. 4 is a schematic view of the transferer in the image formation and the transferer in opening of a double-sided cover according to an embodiment of the present embodiment.
Figure 5:
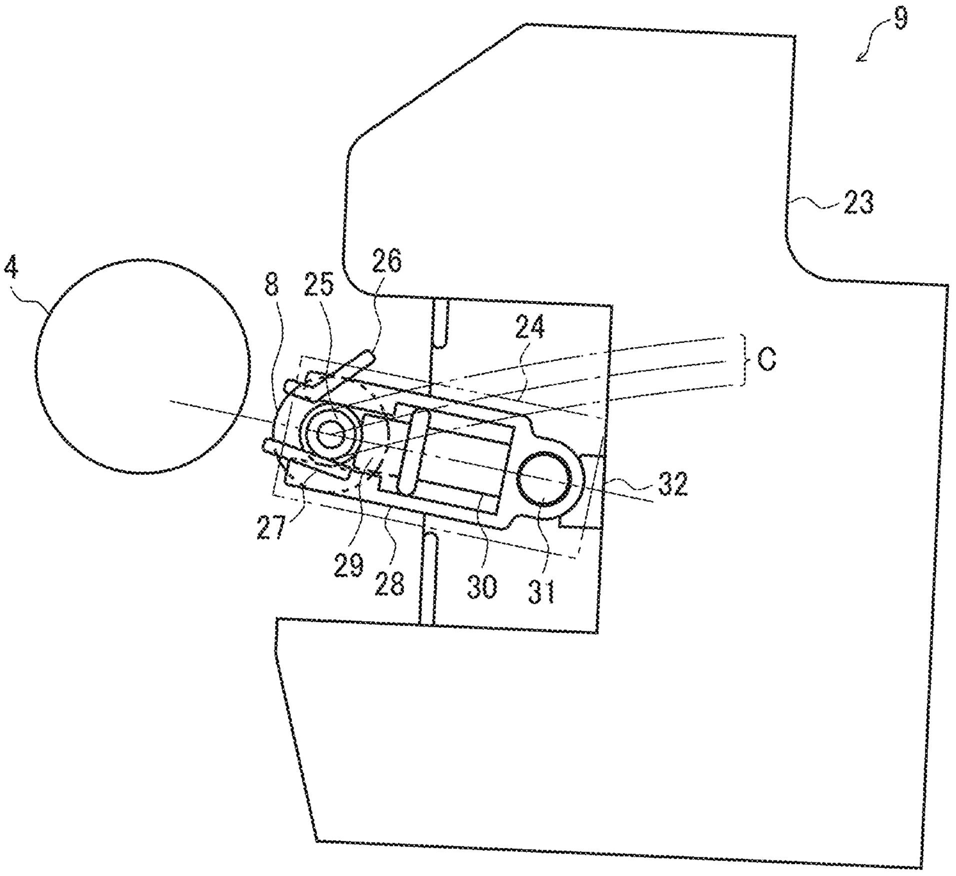
FIG. 5 is schematic view of the transferer in the opening of the double-sided cover according to an embodiment of the present embodiment.

FIG. 4 is a schematic view of the transferer 9 in image formation and the transferer 9 in opening of the double-sided cover 21. In the image formation, the transferer 9 is located in the position indicated by the solid line in FIG. 4, namely, in the state illustrated in FIG. 2. In the opening of the double-sided cover 21 for, for example, clearing a sheet jam, the transferer 9 is located in the position indicated by the two-dot chain line in FIG. 4. FIG. 5 illustrates the position indicated by the two-dot chain line in FIG. 4.

In response to opening of the double-sided cover 21 in the direction of the arrow A from the state illustrated in FIG. 1, the support shaft 31 is displaced from the position indicated by the solid line in FIG. 4 (FIG. 2) to the position indicated by the two-dot chain line in FIG. 4 (FIG. 5). At this time, the pressurizing spring 30 extends in the pressurizer 24, and the transfer roller 8 moves in the receiving portion 28*a* in the direction toward the photoconductor drum 4 until the stopper 29*a* comes into contact with the step 28*b*. The stopper 29*a* is in contact with the step 28*b* to restrict the movement of the slider 29. Thereafter, the transfer roller 8 separates from the photoconductor drum 4.

After the separation, the transfer roller 8 linearly moves along the positioning members 26 and 27 from the position indicated by the solid line in FIG. 4 (FIG. 2) to the position indicated by the two-dot chain line in FIG. 4 (FIG. 5), and the pressurizer 24 swings about the support shaft 31. Then, due to the movement of the transfer roller 8 to the position indicated by the two-dot chain line in FIG. 4 (FIG. 5), the movement trajectory C of the small-diameter portion 25*a* illustrated in FIG. 5, which is the movement path of the transfer member according to the opening of the double-sided cover 21, has no interfere with the positioning members 26. As a result, the double-sided cover 21 can be opened and the sheet conveyance path can be opened without collision between the bearing 25 and the positioning members 26 and 27.

In the configuration described above, due to pressing of the transfer roller 8 against the photoconductor drum 4 by the biasing force of the pressurizing spring 30, the curved face 28*d* comes into contact with the pressure receiver 32*a*, whereby the pressure receiver 32*a* receives a pressurizing force by the pressurizer 24. With the curved face 28*d* in contact with the pressure receiver 32*a*, the support shaft 31 and the hole 28*c* have a certain gap therebetween and are in non-contact with each other (a state in which the pressurizing force acts less even in mutual contact).

Typically, for a transferer provided with a biasing member that directly pressurizes a transfer member, a part that receives a pressurizing force has a corresponding strength so as not to be damaged. However, in the case of the transferer 9 of the present embodiment, the pressurizing force acting on the transfer roller 8 is received by the pressure receiver 32*a* of the receiving member 32 as part of the transfer frame 23. Thus, the pressurizing force does not act on the support shaft 31. Therefore, the support shaft 31 does not have a strength to such an extent that the pressurizing force can be supported. Even if the support shaft 31 is integrated with the transfer frame 23, the support shaft 31 can be narrowed. With such an arrangement, space saving can be implemented and a transferer installable in a small image forming apparatus at low cost can be provided.

Further, in response to the opening of the double-sided cover 21, the spring case 28 is also displaced by receiving the pressurizing force from the pressurizer 24 with the displacement of the double-sided cover 21. However, as described above, the support shaft 31 and the hole 28*c* are fitted through a gap, and no loads act on the pressure receiver 32*a* with the pressurizing force released. Therefore, the pressurizer 24 can be swung, namely, the double-sided cover 21 can be swung smoothly.

As a result, with a space-saving configuration, directly pressurizing of the transfer member with the biasing member and opening and closing of the cover including the transferer without interference can be both implemented.

Furthermore, in the embodiments of the present embodiment, as illustrated in FIG. 3, the pressure receiver 32*a* is provided within a range including the line segment B as an extension line along the pressurizing direction of the transfer roller 8 against the photoconductor drum 4, namely, on the extension line of the line segment B.

With this arrangement, the pressurizing force acting on the transfer roller 8 can be reliably received by the pressure receiver 32*a* of the receiving member 32, and thus space saving can be reliably implemented.

An image forming apparatus includes: a body; a cover openably attached to the body; an image bearer; a transferer attachable to the cover, the transferer including: a transfer roller facing the image bearer and displaceable between: a contact position at which the transfer roller comes into contact with the image bearer; or a separated position at which the transfer roller is separated from the image bearer; and a holder rotatably holding the transfer roller; and a biasing member to bias the transfer roller toward the image bearer to the contact position, a support shaft swingably supporting the holder; and a pressure receiver to receive the holder.

The holder has a first curved face coaxial with the support shaft on an outer face of the holder closer to the support shaft than the transfer roller, the pressure receiver having a second curved face having a curvature identical to the first curved face of the holder, and the first curved face of the holder is in contact with the second curved face of the pressure receiver.

The holder has a hole fitted to the support shaft with a gap.

The holder has a slider slidably movable in the holder and biased by the biasing member toward the transfer roller, the transfer roller moves to the contact position in response to a closing of the cover to the body, and the transfer roller moves to the separated position in response to an opening of the cover from the body.

The pressure receiver is within a range including an extension line along a biasing direction of the biasing member to bias the transfer roller to the image bearer.

In the above embodiments and modification, the example with the monochrome printer 1 as an image forming apparatus to which the present embodiment is applicable has been described. However, the image forming apparatus to which the present embodiment is applicable is not limited thereto, and thus the present embodiment is also applicable to, for example, a full-color printer, a copier, a facsimile, and a multifunction peripheral. Further, the photoconductor drum 4 has been exemplified as an image bearer. However, the image bearer is not limited thereto, and thus may be, for example, an intermediate transfer belt that bears an intermediate transfer image.

In the above embodiments, the transfer sheet S is used as a recording medium on which an image is formed. However, the transfer sheet S is not limited to a recording sheet, and thus may include, for example, a cardboard, a postcard, roll paper, an envelope, plain paper, thin paper, coated paper (e.g., coated sheet and art paper), tracing paper, an overhead projector (OHP) sheet, an OHP film, and a resin film. Any sheet may be used as long as an image can be formed in a sheet shape.

According to the present embodiment, provided can be a transferer that can implement space saving and can be installed in a small image forming apparatus at low cost.

Aspects of the present embodiment are, for example, as follows.

According to Aspect 1, provided is a transferer including: a transferer body provided to a cover openable with respect to an image forming apparatus body; a transfer member provided to the transferer body, the transfer member being disposed opposite an image bearer provided to the image forming apparatus body; a pressurizer provided to the transferer body, the pressurizer being to pressurize the transfer member against the image bearer, in which the pressurizer includes: a holder holding the transfer member rotatably and displaceably in a direction in which the transfer member comes into contact with the image bearer or in a direction in which the transfer member separates from the image bearer, the holder being supported displaceably by the transferer body; and a biasing member being to bias the transfer member in the direction in which the transfer member comes into contact with the image bearer, in response to closing of the cover, the transfer member comes into contact with a positioning member provided to the image forming apparatus body such that the transfer member is positioned and the holder is displaced, in separation of the transfer member from the positioning member, responsive to opening of the cover, a movement path of the transfer member due to the displacement of the holder and the opening of the cover has no interference with the positioning member, the holder is fitted, through a gap, to a support shaft provided to the transferer body, the holder being supported swingably by the support shaft, the holder having a curved face coaxial with the support shaft on an outer face closer to the support shaft, and the transferer body includes a pressure receiver identical in curvature to the curved face, the pressure receiver being in contact with the curved face.

According to Aspect 2, in the transferer of Aspect 1, the pressure receiver is provided within a range including an extension line along a direction in which the transfer member is pressurized against the image bearer.

According to Aspect 3, an image forming apparatus includes the transferer according to Aspect 1 or 2.

The above-described embodiments are illustrative and do not limit the present embodiment. Thus, numerous additional modifications and variations are possible in light of the above teachings. For example, elements and/or features of different illustrative embodiments may be combined with each other and/or substituted for each other within the scope of the present embodiment.

The effects described in the embodiments of the present embodiment are merely examples of the most preferable effects generated from the present embodiment. Thus, the effects of the present embodiment are not limited to those described in the embodiments of the present embodiment.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. An image forming apparatus comprising:
a body;
a cover openably attached to the body;
an image bearer;
a transferer attachable to the cover, the transferer including:
a transfer roller facing the image bearer and configured to displace between,
a contact position at which the transfer roller comes into contact with the image bearer; or
a separated position at which the transfer roller is separated from the image bearer;
a holder configured to rotatably hold the transfer roller; and
a biasing member configured to bias the transfer roller toward the image bearer to the contact position;
a support shaft configured to swingably support the holder; and
a pressure receiver configured to receive the holder, wherein
the holder has a first curved face coaxial with the support shaft on an outer face of the holder closer to the support shaft than the transfer roller,
the pressure receiver has a second curved face having a curvature identical to the first curved face of the holder, and
the first curved face of the holder contacts the second curved face of the pressure receiver.

2. The image forming apparatus according to claim 1, wherein the pressure receiver is within a range including an extension line along a biasing direction of the biasing member to bias the transfer roller to the image bearer.

3. An image forming apparatus comprising:
a body;
a cover openably attached to the body;
an image bearer;
a transferer attachable to the cover, the transferer including:
a transfer roller facing the image bearer and configured to displace between,
a contact position at which the transfer roller comes into contact with the image bearer; or
a separated position at which the transfer roller is separated from the image bearer;
a holder configured to rotatably hold the transfer roller; and
a biasing member configured to bias the transfer roller toward the image bearer to the contact position;
a support shaft configured to swingably support the holder; and
a pressure receiver configured to receive the holder,
wherein the holder defines a hole configured to receive the support shaft, and wherein a gap is defined between the holder and the support shaft.

4. The image forming apparatus according to claim 3, wherein the pressure receiver is within a range including an extension line along a biasing direction of the biasing member to bias the transfer roller to the image bearer.

5. An image forming apparatus comprising:
a body;
a cover openably attached to the body;
an image bearer;
a transferer attachable to the cover, the transferer including:
a transfer roller facing the image bearer and configured to displace between,
a contact position at which the transfer roller comes into contact with the image bearer; or
a separated position at which the transfer roller is separated from the image bearer;
a holder configured to rotatably hold the transfer roller; and
a biasing member configured to bias the transfer roller toward the image bearer to the contact position;
a support shaft configured to swingably support the holder; and
a pressure receiver configured to receive the holder, wherein the holder has a slider, wherein the slider is configured to slidably move in the holder and is biased by the biasing member toward the transfer roller, the transfer roller is configured to move to the contact position in response to a closing of the cover to the body, and the transfer roller is configured to move to the separated position in response to an opening of the cover from the body.

6. The image forming apparatus according to claim 5, wherein the pressure receiver is within a range including an extension line along a biasing direction of the biasing member to bias the transfer roller to the image bearer.

* * * * *